(12) United States Patent
Wingarten

(10) Patent No.: US 11,787,350 B2
(45) Date of Patent: Oct. 17, 2023

(54) ROOF MOUNTED VEHICLE CAMERA ASSEMBLY

(71) Applicant: Avraham Wingarten, Chino Hills, CA (US)

(72) Inventor: Avraham Wingarten, Chino Hills, CA (US)

( * ) Notice: Subject to any disclaimer, the term of this patent is extended or adjusted under 35 U.S.C. 154(b) by 76 days.

(21) Appl. No.: 17/381,964

(22) Filed: Jul. 21, 2021

(65) Prior Publication Data

US 2023/0026675 A1      Jan. 26, 2023

(51) Int. Cl.
| | | |
|---|---|---|
| *B60R 11/04* | (2006.01) | |
| *G03B 7/26* | (2021.01) | |
| *H04N 23/57* | (2023.01) | |
| *H04N 23/65* | (2023.01) | |
| *B60R 11/00* | (2006.01) | |

(52) U.S. Cl.
CPC ............ *B60R 11/04* (2013.01); *G03B 7/26* (2013.01); *H04N 23/57* (2023.01); *H04N 23/65* (2023.01); *B60R 2011/004* (2013.01); *B60R 2300/108* (2013.01)

(58) Field of Classification Search
None
See application file for complete search history.

(56) References Cited

U.S. PATENT DOCUMENTS

| | | |
|---|---|---|
| 6,384,741 B1 | 5/2002 | O'Leary, Sr. |
| 8,137,008 B1 | 3/2012 | Mallano |
| 10,410,069 B2 | 9/2019 | Han |
| 10,543,783 B1 | 1/2020 | Wang |
| 2006/0167595 A1* | 7/2006 | Breed ................ B60R 21/0152 701/1 |
| 2017/0046581 A1* | 2/2017 | Ristevski ............. G06V 20/582 |
| 2017/0297488 A1 | 10/2017 | Wang |
| 2017/0355306 A1 | 12/2017 | Bellotti |
| 2017/0357270 A1* | 12/2017 | Russell ................ G05D 1/0094 |
| 2018/0143639 A1* | 5/2018 | Singhal ............. G06Q 30/0269 |
| 2019/0137622 A1* | 5/2019 | Lopez-Hinojosa ... G01S 13/867 |
| 2019/0359147 A1* | 11/2019 | Zajac ....................... G01V 8/20 |
| 2020/0082713 A1 | 3/2020 | Koravadi |
| 2021/0152991 A1* | 5/2021 | Wu ....................... H04L 1/1864 |

(Continued)

FOREIGN PATENT DOCUMENTS

| | | | |
|---|---|---|---|
| CN | 104899939 A | * | 9/2015 |
| CN | 210970905 U | * | 7/2020 |

(Continued)

*Primary Examiner* — Mohammed Jebari

(57) ABSTRACT

A roof mounted vehicle camera assembly includes a disk that can be positioned on a roof of a vehicle. A magnet is coupled to the disk to magnetically engage the roof of the vehicle for retaining the disk on the roof of the vehicle. A rod is coupled to and extends upwardly from the disk and an orb is coupled to the rod such that the orb is elevated above the roof of the vehicle when the disk is positioned on the roof of the vehicle. A pair of proximity sensors is each of the proximity sensors is integrated into the orb and a camera is integrated into the orb. A transmitter is integrated into the disk and the transmitter is in wireless communication with an extrinsic electronic device to facilitate imagery captured by the camera to be viewed on the extrinsic electronic device thereby facilitating a driver of the vehicle to view the imagery.

1 Claim, 5 Drawing Sheets

(56) References Cited

U.S. PATENT DOCUMENTS

| | | | |
|---|---|---|---|
| 2021/0263165 A1* | 8/2021 | Zheng | G01S 19/51 |
| 2022/0159428 A1* | 5/2022 | Choi | H04W 4/40 |
| 2022/0207652 A1* | 6/2022 | Garcia-Dorado | G06F 17/16 |

FOREIGN PATENT DOCUMENTS

| | | | |
|---|---|---|---|
| CN | 214492734 U | * | 10/2021 |
| RU | 2604952 C1 | * | 12/2016 |
| WO | WO2020178790 | | 9/2020 |

* cited by examiner

ROOF MOUNTED VEHICLE CAMERA ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to vehicle camera devices and more particularly pertains to a new vehicle camera device for facilitating a driver to see over vehicles that are in front of them. The device includes a magnetic base that can engage a roof of a vehicle and an orb that is elevated above the magnetic base. A camera and a pair of proximity sensors are each integrated into the orb for capturing imagery and detecting motion. The device includes a transmitter that is in communication with an extrinsic electronic device to facilitate the driver to view images captured by the camera. Additionally, the extrinsic electronic device produces an alert when either of the proximity sensors senses motion.

(2) Description of Related Art Including Information Disclosed Under 37 CFR 1.97 and 1.98

The prior art relates to vehicle camera devices including a variety of video camera devices that each includes a telescopic rod that is extendable from a vehicle and a camera integrated into the telescopic rod for viewing footage beyond an obstruction. In at least one instance the camera has pan and tilt functions to facilitate a driver to point the camera in a desired direction. The prior art discloses a video camera device that includes a globe that is mountable to a roof of a vehicle and an omnidirectional camera that is integrated into the globe. The prior art discloses a variety of video analysis systems that include a video camera disposed on a vehicle and image processing capabilities to determine potential oncoming danger.

BRIEF SUMMARY OF THE INVENTION

An embodiment of the disclosure meets the needs presented above by generally comprising a disk that can be positioned on a roof of a vehicle. A magnet is coupled to the disk to magnetically engage the roof of the vehicle for retaining the disk on the roof of the vehicle. A rod is coupled to and extends upwardly from the disk and an orb is coupled to the rod such that the orb is elevated above the roof of the vehicle when the disk is positioned on the roof of the vehicle. A pair of proximity sensors is each of the proximity sensors is integrated into the orb and a camera is integrated into the orb. A transmitter is integrated into the disk and the transmitter is in wireless communication with an extrinsic electronic device to facilitate imagery captured by the camera to be viewed on the extrinsic electronic device thereby facilitating a driver of the vehicle to view the imagery.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
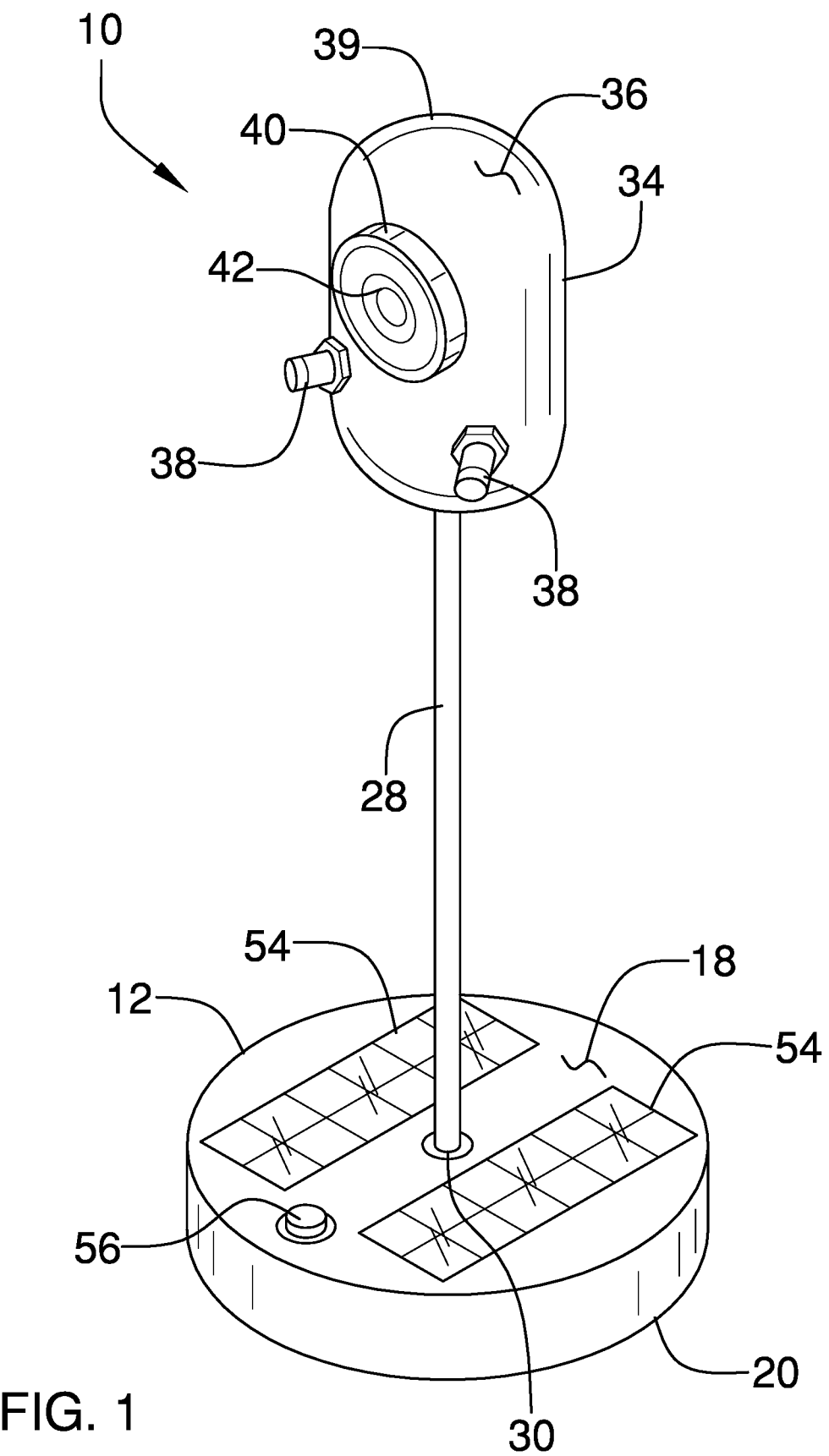
FIG. 1 is a perspective view of a roof mounted vehicle camera assembly according to an embodiment of the disclosure.
Figure 2:
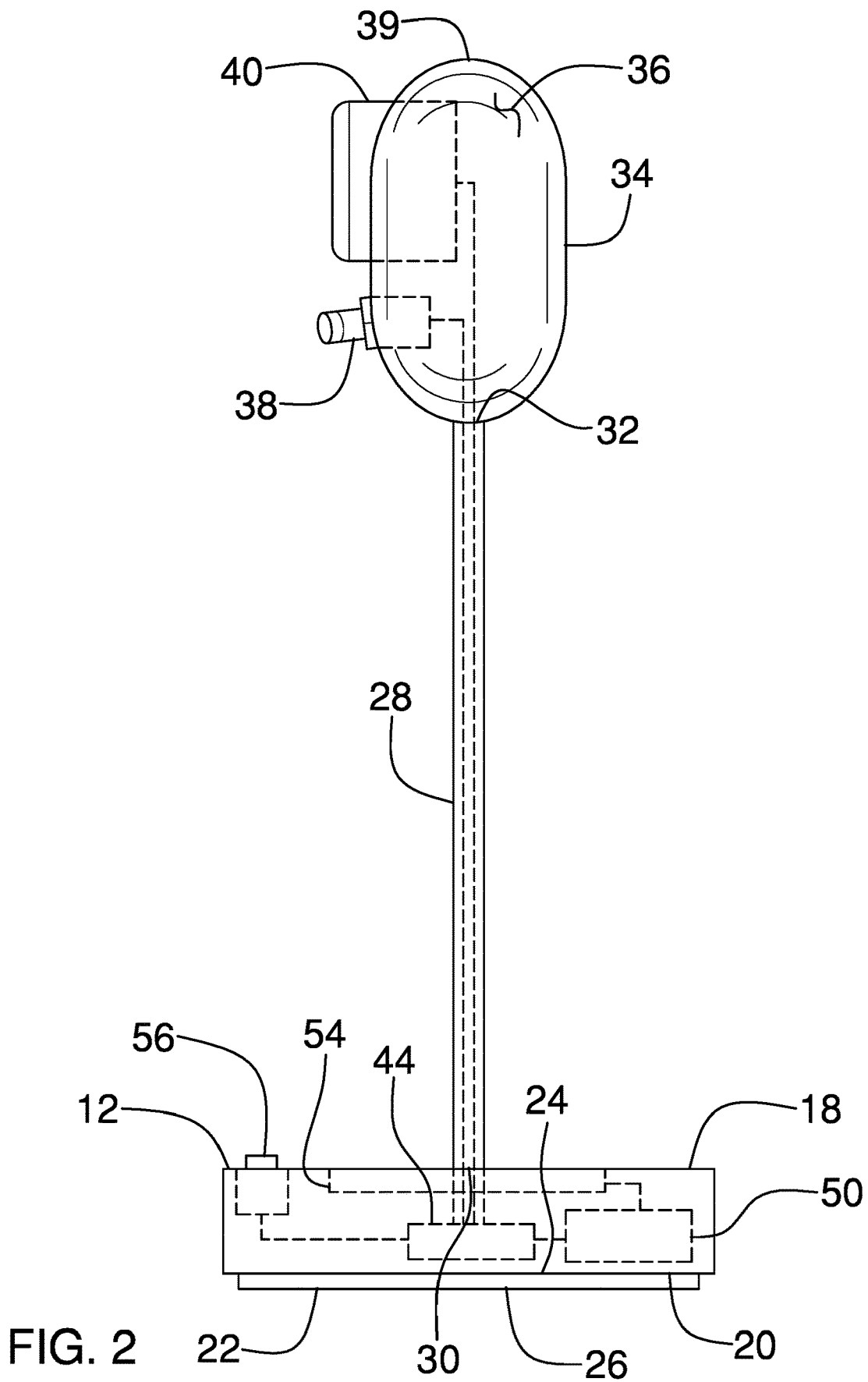
FIG. 2 is a left side phantom view of an embodiment of the disclosure.
Figure 3:
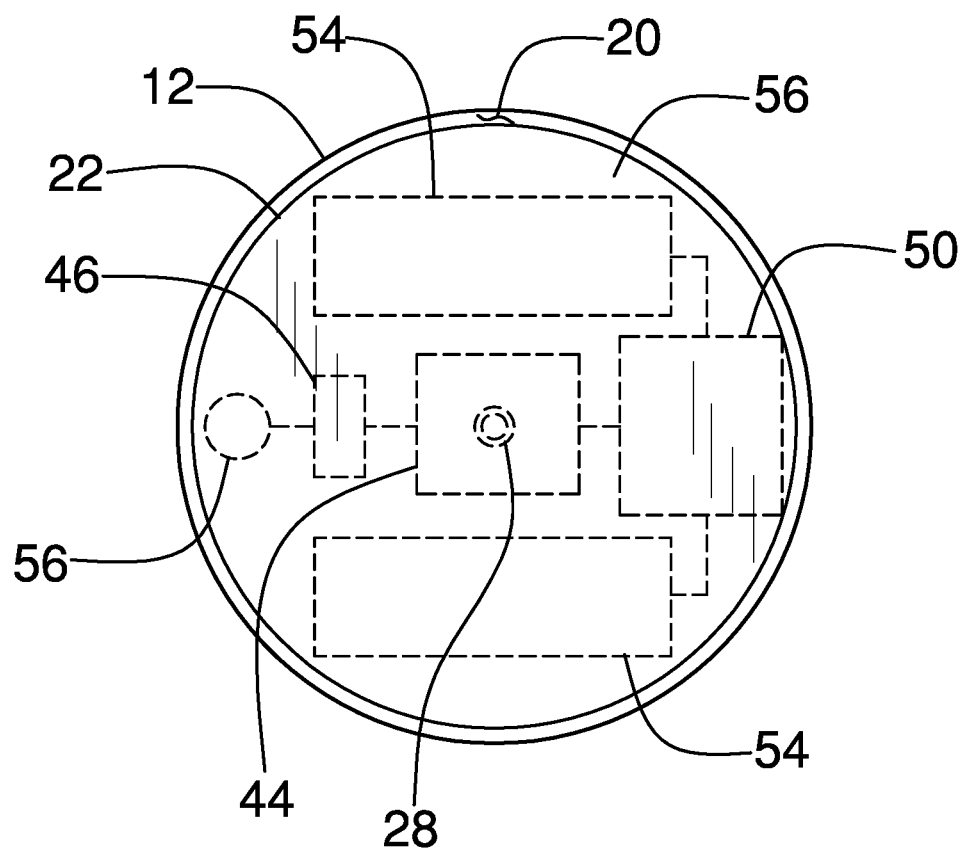
FIG. 3 is a bottom phantom view of an embodiment of the disclosure.
Figure 4:
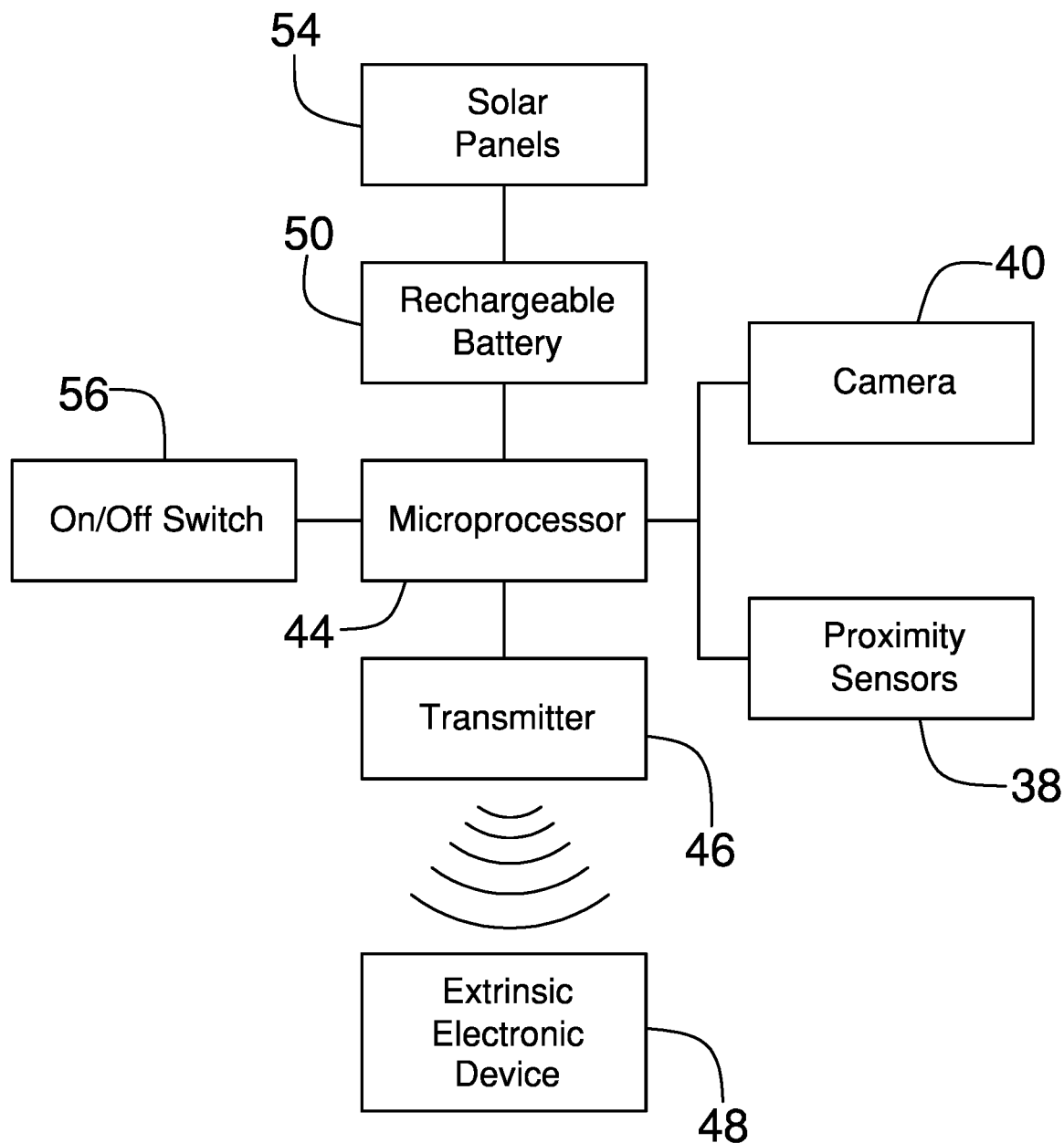
FIG. 4 is a schematic view of an embodiment of the disclosure.
Figure 5:
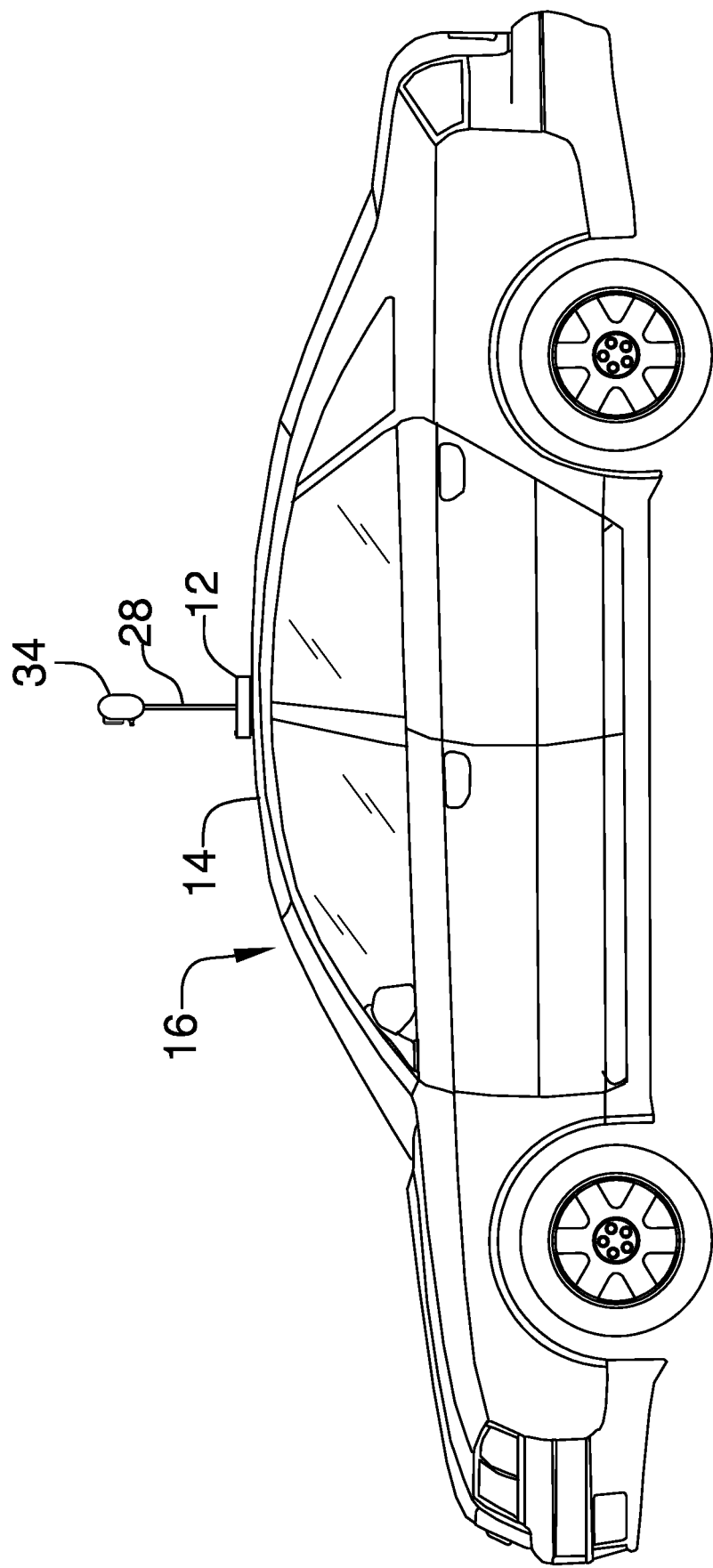
FIG. 5 is a perspective in-use view of an embodiment of the disclosure.

With reference now to the drawings, and in particular to FIGS. 1 through 5 thereof, a new vehicle camera device embodying the principles and concepts of an embodiment of the disclosure and generally designated by the reference numeral 10 will be described.

As best illustrated in FIGS. 1 through 5, the roof mounted vehicle camera assembly 10 generally comprises a disk 12 that can be positioned on a roof 14 of a vehicle 16, such as a passenger vehicle, a sport utility vehicle or other type of motorized vehicle 16 that is driven on public roadways. The disk 12 has a top surface 18 and a bottom surface 20. A magnet 22 is coupled to the disk 12 to magnetically engage the roof 14 of the vehicle 16 for retaining the disk 12 on the roof 14 of the vehicle 16. The magnet 22 has an upper side 24 and a lower side 26, and the upper side 24 is bonded to the bottom surface 20 of the disk 12 to magnetically engage the roof 14 of the vehicle 16. A rod 28 is coupled to and extends upwardly from the disk 12. The rod 28 has a bottom end 30 and a top end 32, and the bottom end 30 is coupled to the top surface 18 of the disk 12. Furthermore, the rod 28 is centrally positioned on the top surface 18.

An orb 34 is coupled to the rod 28 such that the orb 34 is elevated above the roof 14 of the vehicle 16 when the disk 12 is positioned on the roof 14 of the vehicle 16. The orb 34 has an outer surface 36 and the outer surface 36 is continuously arcuate about a centerline of the orb 34 such that the orb 34 is rounded. Furthermore, the orb 34 is elongated about the centerline such that the orb 34 has an ovoid shape. The outer surface 36 is coupled to the top end 32 of the rod 28 having the centerline being oriented to be coextensive with an axis extending between the top end 32 and the bottom end 30 of the rod 28.

A pair of proximity sensors 38 is provided and each of the proximity sensors 38 is integrated into the orb 34 to sense motion within a predetermined distance of the orb 34. Each of the proximity sensors 38 is directed in different directions from the orb 34 with respect to each other. Furthermore, each of the proximity sensors 38 may have a line of sight that is angled approximately 120.0 degrees apart from each other. Each of the proximity sensors 38 extends outwardly through the outer surface 36 of the orb 34. Additionally, each of the proximity sensors 38 is oriented to extend along an axis that is oriented perpendicular to the centerline of the orb 34. Each of the proximity sensors 38 is positioned closer to the top end 32 of the rod 28 than a distal end 39 of the orb 34 with respect to the top end 32 of the rod 28. Additionally, each of the proximity sensors 38 may be electronic motion sensors that have a sensitivity range of at least 30.0 feet.

A camera 40 is integrated into the orb 34 to capture footage of the area surrounding the vehicle 16. The camera 40 extends outwardly through the outer surface 36 of the orb 34 and the camera 40 is positioned above each of the proximity sensors 38. In this way the camera 40 can capture footage of an intersection that is blocked from view by other vehicles that are parked in front of the vehicle 16 in which the driver is driving, for example. Additionally, the camera 40 has a lens 42 that is exposed with respect to the outer surface 36. The camera 40 may comprise a digital video camera of any conventional design. A control circuit 44 is integrated into the disk 12 and the control circuit 44 is electrically coupled to each of the proximity sensors 38 and the camera 40. Furthermore, the control circuit 44 receives an alert input when either of the proximity sensors 38 senses motion.

A transmitter 46 is integrated into the disk 12 and the transmitter 46 is in communication with each of the proximity sensors 38 and the camera 40. The transmitter 46 is in wireless communication with an extrinsic electronic device 48 to facilitate imagery captured by the camera 40 to be viewed on the extrinsic electronic device 48. In this way a driver of the vehicle 16 can remotely view the imagery. The transmitter 46 is electrically coupled to the control circuit 44 and the transmitter 46 broadcasts an alert signal to the extrinsic electronic device 48 when the control circuit 44 receives the alert input. In this way the transmitter 46 can facilitate the driver to be alerted to motion near the vehicle 16. The transmitter 46 may comprise a radio frequency transmitter or the like and the transmitter 46 may employ Bluetooth communication protocols. Additionally, the extrinsic electronic device 48 may comprise a smart phone or other personal electronic device, or the extrinsic electronic device 48 may comprise a Bluetooth system that is integrated into the vehicle 16.

A power supply 50 is integrated into the disk 12 and the power supply 50 is electrically coupled to the control circuit 44. The power supply 50 comprises a battery 52 that is integrated into the disk 12 and the battery 52 is electrically coupled to the control circuit 44. The power supply 50 includes a plurality of solar panels 54 that is each coupled to the top surface 18 of the disk 12 such that each of the solar panels 54 is exposed to sunlight. Each of the solar panels 54 is electrically coupled to the battery 52 for charging the battery 52. The power supply 50 includes a power button 56 that is movably integrated into the top surface 18 of the disk 12 such that the power button 56 is accessible to the driver. The power button 56 is electrically coupled to the control circuit 44 for turning the control circuit 44 on and off.

In use, the disk 12 is placed at a desired location on the roof 14 of the vehicle 16 such that the camera 40 and each of the proximity sensors 38 are directed forwardly on the vehicle 16. In this way the camera 40 can capture footage of the area in front of the vehicle 16 and the proximity sensors 38 detect motion over a broad area in front of the vehicle 16. Additionally, the transmitter 46 is synched with the extrinsic electronic device 48 to facilitate the driver to view the footage captured by the camera 40. In this way the driver can see over vehicles that are parked in front of them at a stoplight, for example, by viewing the footage on the extrinsic electronic device 48. Additionally, the extrinsic electronic device 48 produces an alert when either of the proximity sensors 38 senses motion. In this way the driver is inhibited from inadvertently running over a pedestrian that unexpectedly walks in front of the vehicle 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A roof mounted vehicle camera assembly for enhancing visibility of an area surrounding a vehicle for a driver, said assembly comprising:

a disk being configured to be positioned on a roof of a vehicle, said disk having a top surface and a bottom surface;

a magnet being coupled to said disk wherein said magnet is configured to magnetically engage the roof of the vehicle for retaining said disk on the roof of the vehicle, said magnet having an upper side and a lower side, said upper side being bonded to said bottom surface of said disk wherein said lower side is configured to magnetically engage the roof of the vehicle;

a rod being coupled to and extending upwardly from said disk, said rod having a bottom end and a top end, said bottom end being coupled to said top surface of said disk, said rod being centrally positioned on said top surface;

an orb being coupled to said rod wherein said orb is configured to be elevated above the roof of the vehicle when said disk is positioned on the roof of the vehicle, said orb having an outer surface, said outer surface being continuously arcuate about a centerline of said orb such that said orb is rounded, said orb being elongated about said centerline wherein said orb has an ovoid shape, said outer surface being coupled to said top end of said rod having said centerline being oriented to be coextensive with an axis extending between said top end and said bottom end of said rod;

a pair of proximity sensors, each of said proximity sensors being integrated into said orb wherein each of said proximity sensors is configured to sense motion within a predetermined distance of said orb, each of said proximity sensors being directed in different directions from said orb with respect to each other, each of said proximity sensors extending outwardly through said outer surface of said orb, each of said proximity sensors being oriented to extend along an axis being oriented perpendicular to said centerline of said orb, each of said proximity sensors being positioned closer to said top end of said rod than a distal end of said orb with respect to said top end of said rod;

a camera being integrated into said orb wherein said camera is configured to capture footage of the area surrounding the vehicle, said camera extending outwardly through said outer surface of said orb, said camera being positioned above each of said proximity sensors, said camera having a lens being exposed with respect to said outer surface;

a control circuit being integrated into said disk, said control circuit being electrically coupled to each of said proximity sensors and said camera, said control circuit receiving an alert input when either of said proximity sensors senses motion;

a transmitter being integrated into said disk, said transmitter being in communication with each of said proximity sensors and said camera, said transmitter being in wireless communication with an extrinsic electronic device wherein said transmitter is configured to facilitate imagery captured by said camera to be viewed on the extrinsic electronic device thereby facilitating a driver of the vehicle to view the imagery, said transmitter being electrically coupled to said control circuit, said transmitter broadcasting an alert signal to the extrinsic electronic device when said control circuit receives said alert input wherein said transmitter is configured to facilitate the driver to be alerted to motion near the vehicle; and a power supply being integrated into said disk, said power supply being electrically coupled to said control circuit, said power supply comprising:
  a battery being integrated into said disk, said battery being electrically coupled to said control circuit;
  a plurality of solar panels, each of said solar panels being coupled to said top surface of said disk wherein each of said solar panels is configured to be exposed to sunlight, each of said solar panels being electrically coupled to said battery for charging said battery; and
  a power button being movably integrated into said top surface of said disk wherein said power button is configured to be accessible to the driver, said power button being electrically coupled to said control circuit for turning said control circuit on and off.

* * * * *